United States Patent [19]
Wyers

[11] 3,782,522
[45] Jan. 1, 1974

[54] TRANSFER MECHANISM
[75] Inventor: Joseph H. Wyers, Excelsior, Minn.
[73] Assignee: Fluoroware, Inc., Chaska, Minn.
[22] Filed: Sept. 18, 1972
[21] Appl. No.: 290,171

[52] U.S. Cl. .............................. 198/20 R, 198/131
[51] Int. Cl. ........................................... B65g 47/36
[58] Field of Search .................. 198/20 R, 19, 131, 198/85; 134/75, 125, 130; 118/423, 425, 426

[56] References Cited
UNITED STATES PATENTS
2,640,584  6/1953  Robb .......................... 118/423 X Primary Examiner—Edward A. Sroka
Attorney—Ralph F. Merchant et al.

[57] ABSTRACT

A transfer mechanism is shown, including an endless track positioned in a vertical plane, and a follower member secured to the track. The follower member includes a pick-up member mounted for rotation about a horizontal axis, which has spaced front and back walls. A circular disk is attached at its center perpendicular to an elongated rod adapted to support articles to be transferred. The disk is sized to fit loosely between and generally parallel to the front and rear walls. A V-shaped depression in the front wall supports and centers the rod which extends thereover.

11 Claims, 3 Drawing Figures

PATENTED JAN 1 1974
3,782,522
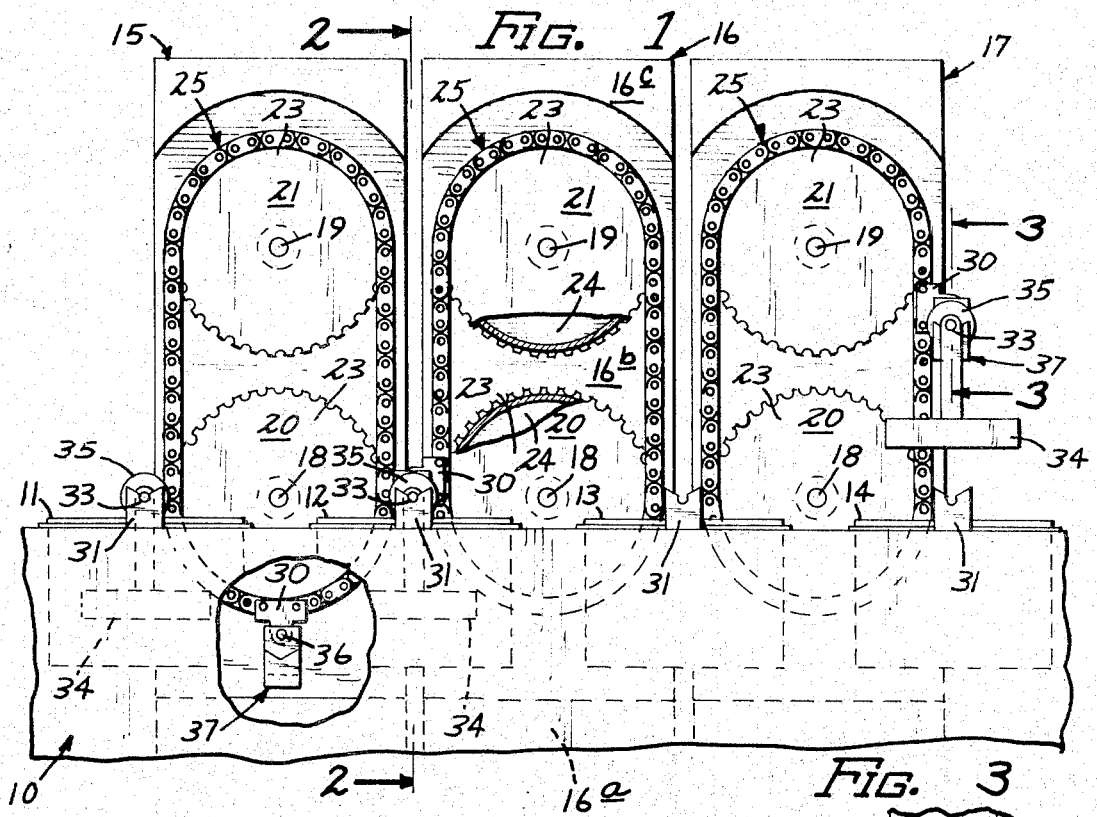
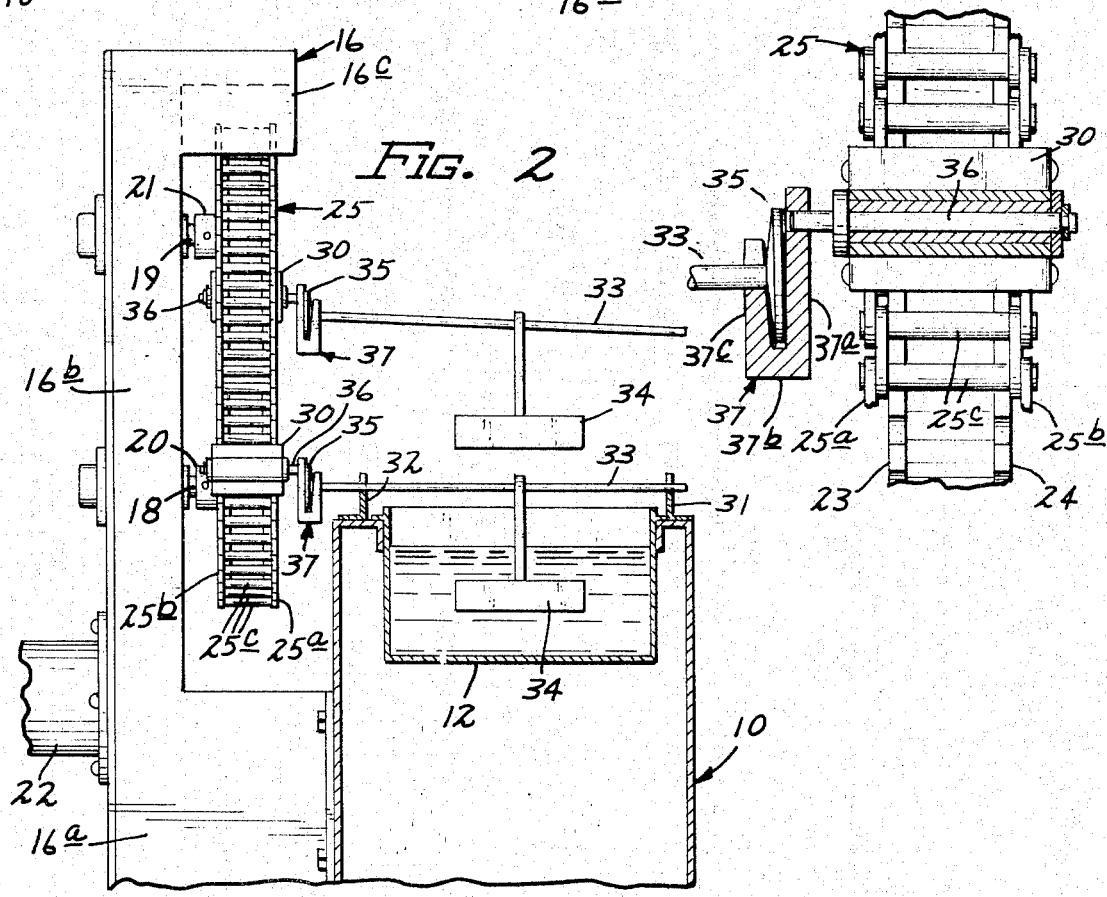

TRANSFER MECHANISM

BACKGROUND OF THE INVENTION

1. Field of the Invention

This invention relates generally to endless track transfer mechanisms and more particularly relates to the structure of the pick-up section of the mechanism.

2. Description of the Prior Art

It is desirable in many manufacturing procedures to provide means for automatically transferring articles from one work station to another. For many years, the assignee of the present invention has been concerned with the development of apparatus for supporting flat disk-like or wafer-like articles in cleaning and plating baths. Typically, the articles are subsequently used in the manufacture of integrated circuits. The articles are normally suspended sequentially in baths for cleaning by chemical or ultrasonic methods, and for plating by chemical or electro-chemical means. Typical prior art articles supporting devices are shown in the Saville U.S. Pat. No. 3,394,819, issued July 30, 1968, and in the Elftmann U.S. Pat. No. 3,473,670, issued Oct. 21, 1969.

In the past, apparatus has not been available which can be relied upon to consistently and automatically transfer baskets from one bath to another. It is evident that the availability of a highly reliable automatic transfer mechanism would decrease the cost of manufacturing items such as the articles mentioned above.

SUMMARY OF THE INVENTION

The present invention provides apparatus that will reliably transfer articles from one station to another. A vertically positioned endless track has one side thereof positioned adjacent one work station and the other side thereof positioned adjacent another work station. An elongated, article supporting rod is normally held in a horizontal position above the work station by a pair of brackets on opposite sides thereof. A circular disk is secured at its center perpendicular to the end of the rod. A pick-up member rotatably mounted on the endless track is designed to engage the disk at one work station and carry the disk and rod along with the moving endless track to the other work station where it is automatically disengaged as the pick-up mechanism moves by the second work station. The pick-up member and the disk are specially designed, as will hereafter be described, to facilitate reliable pick-up and release. If desired, several of these units can be mounted in line to transfer articles through a series of baths. Although the present transfer mechanism has been disigned primarily for use in transferring baskets sequentially through cleaning and plating baths, it is evident that the same concept and structure can be used to facilitate automatic transfer to articles in many manufacturing procedures.

BRIEF DESCRIPTION OF THE DRAWINGS

FIG. 1 is a view in side elevation of three automatic transfer mechanisms according to the present invention, portions thereof being broken away;

FIG. 2 is a view in vertical section taken along line 2—2 of FIG. 1; and

FIG. 3 is an enlarged fragmentary sectional view taken along line 3—3 of FIG. 1.

DESCRIPTION OF THE PREFERRED EMBODIMENT

Referring now to the drawings, wherein like reference numerals will be used throughout the several views to indicate like elements of the invention, there is disclosed a work table 10 having a horizontal top surface in which are mounted a series of evenly spaced containers 11, 12, 13 and 14. Each container could be described as a work station, and each contains a quantity of fluid which is designed to clean or otherwise treat articles suspended therein. Bolted to the rear wall of work table 10 are three transfer mechanism housings 15, 16 and 17. Because the three transfer mechanisms are identical in construction, only one will be described in detail.

Referring to FIG. 2, housing 16 has a base portion 16a secured to table 10, an upstanding intermediate portion 16b and a forwardly extending top hood portion 16c. Intermediate portion 16b has spaced, parallel front and rear walls which extend vertically upwardly above the top surface of work table 10. Extending through and rotatably mounted in the front and rear walls of intermediate portions 16b are a pair of vertically aligned, parallel shafts 18 and 19 which carry sprocket wheels 20 and 21 respectively. Each of the housings 5, 16 and 17 is provided with separate drive means (not shown) to rotate the bottom shaft 18. Housing 16 is provided with a drive housing 22 at its rear through which the drive shaft enters to drive a sprocket and chain assembly (not shown) in housing 16 which drives shaft 18 as desired.

As best shown in FIG. 3 the sprocket wheels comprise spaced, front and rear circular disks 23 and 24 each having peripheral teeth to engage the corresponding endless drive track 25. Each drive track 25 comprises two sets of spaced link members 25a, 25b connected by horizontally extending, spaced rods 25c which engage the sprocket teeth in the sprocket disks 23 and 24. As best shown in FIGS. 1 and 2, the drive track 25 operatively engages the upper and lower sprocket wheels 20 and 21 for movements in a generally vertical plane.

Housing 16 is mounted so that the shafts 18 and 19 are midway between the two containers 12 and 13. One side of the endless track 25 thus passes by container 12 while the other side passes by container 13. Each of the tracks 25 is provided with a follower member 30 secured to the outer surface thereof for travel therewith. The containers 12, 13 and the sprocket wheels 20, 21 are sized so that the follower member 30 passes the center of the containers 12 and 13 as it moves with the endless track 25. Mounted on the top surface of work table 10 adjacent the front and rear edges thereof and at the center of container 12 are a pair of upstanding bracket members 31 and 32 each having a V-shaped notch formed in the upper edge thereof. The bracket members 31, 32 support an elongated rod 33 which carries near its center an article supporting basket 34 similar to the types shown in the previously mentioned Saville and Elftmann patents. As shown in FIG. 1, a pair of bracket members 31 and 32 is associated with each of the containers in similar relationship, Each pair is adapted to support a rod 33 as shown in FIG. 2.

As best shown in FIG. 3, each rod 33 is provided with a circular disk 35 at its rear end. Circular disk 35 is attached at its center to the end of the rod, prependicular thereto. The front face of disk 35, which is attached to the end of the rod 33, has a generally conical configuration with the disk being thicker at its center and diverging downwardly to a thinner peripheral edge. The rear wall of the disk 35 is substantially planar. The angle of divergence of the front wall as compared to the plane which is parallel to the rear wall is approximately four to five degrees.

As previously indicated, the follower member 30 is secured to the outer surface of the endless track 25. Member 30 comprises a bearing member having a horizontally extending bearing opening therein. A horizontally extending axle member 36 is rotatably mounted in the bearing opening, with a front end extending forwardly therefrom. The forwardly extending end of the axle 36 supports a pick-up member 37 which is generally U-shaped in cross section with a back plate portion 37a secured to the end of the axle 36. Back plate portion 37a is a generally rectangular member which is supported in a generally vertical plane perpendicular to the horizontally extending axle 36. Pick-up member 37 also includes a bottom portion 37b extending forwardly from the bottom edge of back portion 37a, and a front plate portion 37c extending upwardly from bottom portion 37b generally parallel to but spaced from the back plate. Front plate portion 37c is also generally rectangular and has a generally V-shaped depression formed in its top edge.

As best shown in FIG. 3, the front plate or wall portion 37c has a rear surface which faces the back plate or back wall portion 37a. This rear surface diverges upwardly away from the bottom portion 37b at a predetermined angle, which in the preferred embodiment is four or five degrees with respect to a vertical plane. This upwardly diverging rear surface is planar and preferably has the same angle of divergence as the previously mentioned angle of divergence of the front wall of the disk 35.

Disk 35 is sized to loosely fit between the front portion 37c and the back portion 37a with the rod 33 resting in the depression in the top edge of front portion 37c. Disk 35 is slightly thinner than the distance between the front and rear portions of the pick-up member 37 so that as shown in FIG. 3 the weight of the rod 33 causes it to tilt a slightly amount before it wedges in place.

In FIG. 1, the follower member 30 of transfer mechanism 16 is in position to pick up the rod 33 which is suspended over the container 12. Assuming that the endless track 25 moves in a clockwise direction as viewed in FIG. 1, the pick-up member 37 will move up smoothly under corresponding disk 35 and as it continues to move will pick up the disk and rod for transfer therewith. The disk, rod and basket will thus be carried upwardly over sprocket 21 by the moving track and then downwardly toward container 13. When the follower member 30 reaches the area of the top surface of container 13, the forwardly extending rod 33 is deposited in the upwardly extending bracket members associated with container 13. As the rod 33 comes to rest, the disk 35 disengages from the pick-up member 37 as the pick-up member 37 continues to move downwardly toward the bottom of sprocket 20. I have found that the mating, diverging surfaces of the disk 35 and front wall portion 37c facilitate very accurate and reliable engagement and disengagement therebetween. Because of these mating, diverging surfaces, there is no tendency for the disk to either miss engagement or refuse to disengage.

In operating a sequence of machines as shown in FIG. 1, each transfer mechanism would be timed to operate at predetermined intervals. Further, appropriate circuitry is provided to prevent the operation of any one transfer mechanism until the next container is empty. Thus, a basket placed in container 11 will not be transferred by mechanism 15 until container 12 is empty. However, once the basket has been transferred from container 12 to container 13, and the predetermined time period has elapsed, mechanism 15 will be free to automatically transfer the basket from container 11 to container 12. A basket placed in container 11 will thus be automatically transferred sequentially to container 14. These transfer mechanisms can be used alone to transfer devices between a single pair of stations, or a large number can be lined up to transfer articles sequentially through a large number of work stations.

What is claimed is:

1. A transfer mechanism including carrier means following an endless path in a generally vertical plane, a follower member secured thereto having a back wall portion, a bottom portion and a front wall portion spaced from said back wall portion, said follower member further including a bearing member secured to said carrier means, and a horizontally extending axle member rotatably mounted in said bearing member and having one end extending therefrom, said one end being attached to said back wall portion to support said back wall portion and front wall portion in generally parallel and vertical planes, a support member having opposite ends and a disk member secured to one of said ends, said disk member being sized to fit between said front and back wall portions with said support member extending over said front wall portion.

2. The apparatus of claim 1 wherein said front wall portion includes a top edge having a depression therein to center said support member, wherein said support member is a rod and said disk is substantially circular, with said rod extending from the center of said disk perpendicular thereto.

3. A transfer mechanism including endless means following a predetermined path in a generally vertical plane, a follower member rotatably secured thereto having a back wall portion positioned in a generally vertical plane, a bottom portion, and a front wall portion positioned in a generally vertical plane and spaced from said back wall portion, a support member having opposite ends and a disk member secured to one of said ends, said disk member being sized to fit between said front and back wall portions with said support member extending over said front wall portion.

4. A transfer mechanism including carrier means following an endless track in a generally vertical plane, a follower member rotatably secured thereto having a back wall portion, a bottom portion and a front wall portion spaced from said back wall portion, a support member having opposite ends and a disk member secured at substantially a center of said disk member to one of said ends, said disk member being sized to fit between said front and back wall portions for support thereby, with said support member extending over said front wall portion.

5. The apparatus of claim 1 wherein said follower member includes a bearing member secured to said carrier means, and a horizontally extending axle member rotatably mounted in said bearing member and having one end extending therefrom, said one end being attached to said back wall portion to support said back wall portion and front wall portion in generally parallel and vertical planes.

6. The apparatus of claim 1 wherein said front wall portion includes a top edge having a depression therein to center said support member.

7. The apparatus of claim 1 wherein said support member is a rod and said disk is circular, with said rod extending from the center of said disk perpendicular thereto.

8. The apparatus of claim 7 wherein said front wall portion has a rear surface facing said back wall portion, said rear surface diverging upwardly away from said bottom portion at a predetermined angle, and wherein said disk has a front face connected to said rod which has a generally conical configuration with approximately the same angle of divergence from its center to its edge as said predetermined angle.

9. A transfer mechanism, comprising:
 a. endless track means mounted for movement in a generally vertical plane;
 b. a bearing member secured to an outer surface of said endless track means for travel therewith;
 c. a horizontally extending axle member rotatably mounted in said bearing member, said axle member having one end extending from said bearing member;
 d. a pick-up member mounted on said one end of said axle member, said pick-up member being generally U-shaped in cross section with a back plate portion attached to said one, a bottom portion extending forwardly therefrom, and a front plate portion having a top edge with a depression formed therein;
 e. an elongated rod adapted to support articles to be transferred; and
 f. a circular disk attached to its center to one end of said rod, perpendicular thereto, said disk being sized to loosely fit between the front plate portion and back plate portion of said pick-up member with said rod resting in said depression to thereby support said rod in a generally horizontally extending position.

10. The apparatus of claim 9 wherein said front plate portion has a rear surface which diverges upwardly from said bottom portion and away from said back plate portion at a predetermined angle.

11. The apparatus of claim 10 wherein said circular disk has a relatively flat, truncated conical face attached to its center to said rod, said face sloping to a periphery of said disk which is thinner than the center thereof at generally said same predetermined angle.

* * * * *